United States Patent
Pancorbo Marcos et al.

(10) Patent No.: US 12,016,068 B2
(45) Date of Patent: Jun. 18, 2024

(54) METHOD AND APPARATUS FOR SESSION MANAGEMENT

(71) Applicant: Telefonaktiebolaget LM Ericsson (publ), Stockholm (SE)

(72) Inventors: Maria Belen Pancorbo Marcos, Madrid (ES); Juying Gan, Shanghai (CN); Erik Wikström, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 360 days.

(21) Appl. No.: 17/608,917

(22) PCT Filed: Apr. 16, 2020

(86) PCT No.: PCT/CN2020/085152
§ 371 (c)(1),
(2) Date: Nov. 4, 2021

(87) PCT Pub. No.: WO2020/224411
PCT Pub. Date: Nov. 12, 2020

(65) Prior Publication Data
US 2022/0304089 A1 Sep. 22, 2022

(51) Int. Cl.
*H04W 76/15* (2018.01)
*H04W 60/00* (2009.01)
*H04W 80/10* (2009.01)

(52) U.S. Cl.
CPC ........... *H04W 76/15* (2018.02); *H04W 60/00* (2013.01); *H04W 80/10* (2013.01)

(58) Field of Classification Search
CPC ...... H04W 76/15; H04W 60/00; H04W 80/10
(Continued)

(56) References Cited

U.S. PATENT DOCUMENTS 9,226,265 B2 * 12/2015 Gupta ................... H04W 72/30
10,448,239 B2 * 10/2019 Faccin ................ H04L 65/1073
(Continued)

FOREIGN PATENT DOCUMENTS

CN 106211114 A 12/2016
CN 108696950 A 10/2018
(Continued)

OTHER PUBLICATIONS

Nokia et al., "Removing Subscribed GBR from PDU Session policy control subscription information", 3GPP TSG-SA2 Meeting #129, Dongguan, China, Oct. 15-19, 2018, pp. 1-5, S2-1811332, 3GPP.
(Continued)

*Primary Examiner* — Nghi H Ly
(74) *Attorney, Agent, or Firm* — COATS & BENNETT, PLLC

(57) ABSTRACT

Embodiments of the present disclosure provide methods and apparatuses for session management. A method comprises receiving from a user equipment (UE) a request for establishing another session to a data network identified by a data network identification. At least one existing session of the UE has been established to the data network. The method further comprises checking whether the subscription data or the policy data for the UE includes a first indication which indicates that a same session management node for multiple sessions to the data network identified by the same data network identification is required. The method further comprises selecting the same session management node as the at least one existing session for the UE when the subscription data or the policy data includes the first indication. The method further comprises sending a session establishment request to the selected session management node.

16 Claims, 11 Drawing Sheets

(58) Field of Classification Search
USPC ....... 455/435.1, 432.1, 422.1, 436, 442, 450
See application file for complete search history.

(56) References Cited

U.S. PATENT DOCUMENTS

| | | | |
|---|---|---|---|
| 10,827,553 | B2 | 11/2020 | Zhang |
| 11,172,521 | B2 | 11/2021 | Liu et al. |
| 2012/0002545 | A1 | 1/2012 | Watfa et al. |
| 2017/0339609 | A1* | 11/2017 | Youn ..................... H04W 76/11 |
| 2019/0116521 | A1 | 4/2019 | Qiao et al. |
| 2019/0246370 | A1* | 8/2019 | Xu ........................ H04W 60/04 |
| 2020/0015294 | A1 | 1/2020 | Xin et al. |
| 2020/0154515 | A1 | 5/2020 | Ni et al. |

FOREIGN PATENT DOCUMENTS

| | | |
|---|---|---|
| CN | 109548137 A | 3/2019 |
| WO | 2018000319 A1 | 1/2018 |
| WO | 2018141255 A1 | 9/2018 |
| WO | 2018170696 A1 | 9/2018 |
| WO | 2019015419 A1 | 1/2019 |

OTHER PUBLICATIONS

Huawei, et al., "Subscription of selecting the same SMF and UPF", TSG-SA WG2 Meeting #128, Vilnius, Lithuania, Jul. 2-6, 2018, pp. 1-5, S2-187530, 3GPP.

Ericsson, et al., "23.501: SMF selection", SA WG2 Meeting #118BIS, Spokane, WA, USA, Jan. 16-20, 2017, pp. 1-3, S2-170679, 3GPP.

3rd Generation Partnership Project, "Technical Specification Group Services and System Aspects; Policy and Charging Control Framework for the 5G System; Stage 2 (Release 16)", 3GPP TS 23.503 V16.0.0, Mar. 2019, pp. 1-84.

3rd Generation Partnership Project, "Technical Specification Group Services and System Aspects; System Architecture for the 5G System; Stage 2 (Release 16)", 3GPP TS 23.501 V16.0.2, Apr. 2019, pp. 1-317.

3rd Generation Partnership Project, "Technical Specification Group Services and System Aspects; Procedures for the 5G System; Stage 2 (Release 16)", 3GPP TS 23.502 V16.0.2, Apr. 2019, pp. 1-419.

Nokia et al., "Usage monitoring for multiple PCF deployment of the same DNN and S-NSSAI", SA WG2 Meeting #129 Bis, West Palm Beach, USA, Nov. 26-30, 2018, pp. 1-4, S2-1813330, 3GPP.

Huawei, et al., " T S23.502: Procedures for policy management when AMF relocation", SA WG2 Meeting #124, Nov. 27-Dec. 1, 2017, Reno, Nevada, USA, pp. 1-8, S2-178625, 3GPP.

* cited by examiner

300

302

Obtaining the subscription data from a data management node during the UE's registration procedure or when the data management node updates the subscription data

304

Receiving from a user equipment (UE) a request for establishing another session to a data network identified by a data network identification, wherein at least one existing session of the UE has been established to the data network

306

Checking whether the subscription data or the policy data for the UE includes a first indication which indicates that a same session management node for multiple sessions to the data network identified by the same data network identification is required

308

Selecting the same session management node as the at least one existing session for the UE when the subscription data or the policy data includes the first indication

310

Sending a session establishment request to the selected session management node

402
Obtaining the policy data from the policy control node during the UE's registration procedure or when the policy control node updates the policy data

404
Receiving from a user equipment (UE) a request for establishing another session to a data network identified by a data network identification, wherein at least one existing session of the UE has been established to the data network

406
Checking whether the subscription data or the policy data for the UE includes a first indication which indicates that a same session management node for multiple sessions to the data network identified by the same data network identification is required

408
Selecting the same session management node as the at least one existing session for the UE when the subscription data or the policy data includes the first indication

410
Sending a session establishment request to the selected session management node

FIG. 4

500 ─┐
```
┌──────────────────────────────────────────────────────────────────┐ ╱ 502
│ Receiving a session establishment request including a second indication │
│  selecting a same policy control node as at least one existing session of a │
│  user equipment (UE), wherein the session establishment request is used │
│ for establishing another session of the UE to a data network identified by │
│  a data network identification and the least one existing session of the UE │
│                has been established to the data network                │
└──────────────────────────────────────────────────────────────────┘
                                    │
┌──────────────────────────────────────────────────────────────────┐ ╱ 504
│   Selecting the same policy control node as at least one existing session of │
│                                the UE                                │
└──────────────────────────────────────────────────────────────────┘
```

FIG. 5

600 ─┐
```
┌──────────────────────────────────────────────────────────────────┐ ╱ 602
│     Obtaining policy data of a user equipment (UE) including a first │
│  indication indicating that a same session management node for multiple │
│    sessions of the UE to a data network identified by a data network │
│                      identification is required                      │
└──────────────────────────────────────────────────────────────────┘
                                    │
┌──────────────────────────────────────────────────────────────────┐ ╱ 604
│                         Storing the policy data                         │
└──────────────────────────────────────────────────────────────────┘
```

FIG. 6

METHOD AND APPARATUS FOR SESSION MANAGEMENT

TECHNICAL FIELD

The non-limiting and exemplary embodiments of the present disclosure generally relate to the technical field of communications, and specifically to methods and apparatuses for session management.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for fifth generation (5G) system such as new radio (NR) has been proposed. FIG. 1 is a diagram illustrating an exemplary 5G system architecture, which is a copy of FIG. 4.2.3-1 of 3rd Generation Partnership Project (3GPP) TS 23.501 V16.0.2, the disclosure of which is incorporated by reference herein in its entirety. As shown in FIG. 1, 5G system architecture may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), User Equipment (UE), (Radio) Access Network ((R)AN), etc.

As described in clause of 6.3.2 in 3GPP TS 23.501 v16.0.2, if there is an existing protocol data unit (PDU) Session and the UE requests to establish another PDU Session to the same data network name (DNN) and single network slice selection assistance information (S-NSSAI) and the UE subscription data indicates the support for interworking with Evolved Packet System (EPS) for this DNN and S-NSSAI, the same SMF shall be selected. Otherwise, if UE subscription data does not indicate the support for interworking with EPS for this DNN and S-NSSAI, a different SMF may be selected. For example, to support a SMF load balancing or to support a graceful SMF shutdown (e.g., a SMF starts to no more take new PDU Sessions).

As described in clause of 6.3.7.1 in 3GPP TS 23.501 v16.0.2, the SMF may utilize the NRF to discover the candidate PCF instance(s) for a PDU Session. In addition, PCF information may also be locally configured in the SMF. The SMF selects a PCF instance based on the available PCF instances obtained from the NRF or locally configured information in the SMF, depending on operator's policies.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The existing SMF selection and PCF selection for multiple PDU Sessions of the UE towards the same DNN and S-NSSAI have some problems. For example, when a UE establishes multiple PDU Sessions towards the same DNN and S-NSSAI, if interworking with EPS is not supported, there is no mechanism for the AMF to select the same SMF. In addition, when the same SMF is selected by the AMF for the UE's additional PDU Session(s) towards the same DNN and S-NSSAI, there is no mechanism to ensure that the SMF selects the same PCF. As a consequence of these problems, usage monitoring for the DNN and S-NSSAI for the UE may not be possible, and the UE may consume more quota than allowed in its policy subscription.

To overcome or mitigate the above mentioned problems or other problems or provide a useful solution, the embodiments of the present disclosure propose a session management solution which can ensure that an access and mobility management node such as AMF selects the same session management node such as SMF for multiple sessions of the UE towards the same data network for example identified by DNN and S-NSSAI when this is required by subscription data or policy data associated with the data network identification for the UE. In addition, the proposed session management solution can ensure that when the same session management node such as SMF is selected by the access and mobility management node such as AMF for multiple sessions of the UE towards the same data network identification such as DNN and S-NSSAI, the session management node such as SMF selects the same policy control node such as PCF based on an indication from the access and mobility management node such as AMF.

In a first aspect of the disclosure, there is provided a method at an access and mobility management node. The method comprises receiving from a user equipment (UE) a request for establishing another session to a data network identified by a data network identification. At least one existing session of the UE has been established to the data network. The method further comprises checking whether the subscription data or the policy data for the UE includes a first indication which indicates that a same session management node for multiple sessions to the data network identified by the same data network identification is required. The method further comprises selecting the same session management node as the at least one existing session for the UE when the subscription data or the policy data includes the first indication. The method further comprises sending a session establishment request to the selected session management node.

In an embodiment, the session establishment request may include a second indication selecting the same policy control node as the at least one existing session.

In an embodiment, the first indication may further indicate that a same policy control node for the multiple sessions of the UE to the data network identified by the data network identification is required.

In an embodiment, the data network identification may be identified by a data network name (DNN) and single network slice selection assistance information (S-NSSAI).

In an embodiment, the method according to first aspect of the disclosure may further comprise obtaining the subscription data from a data management node during the UE's registration procedure or when the data management node updates the subscription data.

In an embodiment, the data management node may be a unified data management (UDM) node.

In an embodiment, the subscription data may be obtained from an Nudm_SDM_Get service operation or from Nudm_SDM_Notification service operation.

In an embodiment, the method according to first aspect of the disclosure may further comprise obtaining the policy data from the policy control node during the UE's registration procedure or when the policy control node updates the policy data.

In an embodiment, the policy data may be obtained from an Npcf_AMPolicyControl_Create service operation and/or Npcf_AMPolicyControl_Update service operation.

In an embodiment, the session establishment request may be a protocol data unit (PDU) session establishment request including the second indication.

In an embodiment, the access and mobility management node may be an access and mobility management function (AMF) node, the session management node may be a session management function (SMF) node, and the policy control node may be a policy control function (PCF) node.

In a second aspect of the disclosure, there is provided a method at a session management node. The method comprises receiving a session establishment request including a second indication selecting a same policy control node as at least one existing session of a user equipment (UE). The session establishment request is used for establishing another session of the UE to a data network identified by a data network identification and the least one existing session of the UE has been established to the data network. The method further comprises selecting the same policy control node as at least one existing session of the UE.

In a third aspect of the disclosure, there is provided a method at a policy control node. The method comprises obtaining policy data of a user equipment (UE) including a first indication indicating that a same session management node for multiple sessions of the UE to a data network identified by a data network identification is required. The method further comprises storing the policy data.

In an embodiment, the method according to the third aspect of the disclosure may further comprise sending the policy data to an access and mobility management node during the UE's registration procedure or when the policy control node updates the policy data.

In a fourth aspect of the disclosure, there is provided a method at a data management node. The method comprises obtaining subscription data of a user equipment (UE) including a first indication indicating that a same session management node for multiple sessions of the UE to a data network identified by a data network identification is required. The method further comprises storing the subscription data.

In an embodiment, the method according to the fourth aspect of the disclosure may further comprise sending the subscription data to an access and mobility management node during the UE's registration procedure or when the data management node updates the subscription data.

In a fifth aspect of the disclosure, there is provided an apparatus at an access and mobility management node. The apparatus comprises a processor; and a memory coupled to the processor, said memory containing instructions executable by said processor, whereby said apparatus is operative to receive from a user equipment (UE) a request for establishing another session to a data network identified by a data network identification. At least one existing session of the UE has been established to the data network. Said apparatus is further operative to check whether the subscription data or the policy data for the UE includes a first indication which indicates that a same session management node for multiple sessions to the data network identified by the same data network identification is required. Said apparatus is further operative to select the same session management node as the at least one existing session for the UE when the subscription data or the policy data includes the first indication. Said apparatus is further operative to send a session establishment request to the selected session management node.

In a sixth aspect of the disclosure, there is provided an apparatus at a session management node. The apparatus comprises a processor; and a memory coupled to the processor, said memory containing instructions executable by said processor, whereby said apparatus is operative to receive a session establishment request including a second indication selecting a same policy control node as at least one existing session of a user equipment (UE), wherein the session establishment request is used for establishing another session of the UE to a data network identified by a data network identification and the least one existing session of the UE has been established to the data network. Said apparatus is further operative to select the same policy control node as at least one existing session of the UE.

In a seventh aspect of the disclosure, there is provided an apparatus at a policy control node. The apparatus comprises a processor; and a memory coupled to the processor, said memory containing instructions executable by said processor, whereby said apparatus is operative to obtain policy data of a user equipment (UE) including a first indication indicating that a same session management node for multiple sessions of the UE to a data network identified by a data network identification is required. Said apparatus is further operative to store the policy data.

In an eighth aspect of the disclosure, there is provided an apparatus at a data management node. The apparatus comprises a processor; and a memory coupled to the processor, said memory containing instructions executable by said processor, whereby said apparatus is operative to obtain subscription data of a user equipment (UE) including a first indication indicating that a same session management node for multiple sessions of the UE to a data network identified by a data network identification is required. Said apparatus is further operative to store the subscription data.

In a ninth aspect of the disclosure, there is provided a computer program product, comprising instructions which, when executed on at least one processor, cause the at least one processor to carry out the method according to the first aspect of the disclosure.

In a tenth aspect of the disclosure, there is provided a computer program product, comprising instructions which, when executed on at least one processor, cause the at least one processor to carry out the method according to the second aspect of the disclosure.

In an eleventh ninth aspect of the disclosure, there is provided a computer program product, comprising instructions which, when executed on at least one processor, cause the at least one processor to carry out the method according to the third aspect of the disclosure.

In a twelfth aspect of the disclosure, there is provided a computer program product, comprising instructions which, when executed on at least one processor, cause the at least one processor to carry out the method according to the fourth aspect of the disclosure.

In a thirteenth aspect of the disclosure, there is provided a computer-readable storage medium storing instructions which when executed by at least one processor, cause the at least one processor to carry out the method according to the first aspect of the disclosure.

In a fourteenth aspect of the disclosure, there is provided a computer-readable storage medium storing instructions which when executed by at least one processor, cause the at least one processor to carry out the method according to the second aspect of the disclosure.

In a fifteenth aspect of the disclosure, there is provided a computer-readable storage medium storing instructions which when executed by at least one processor, cause the at least one processor to carry out the method according to the third aspect of the disclosure.

In a sixteenth aspect of the disclosure, there is provided a computer-readable storage medium storing instructions which when executed by at least one processor, cause the at least one processor to carry out the method according to the fourth aspect of the disclosure.

Many advantages may be achieved by applying the proposed solution according to embodiments of the present disclosure. For example, the proposed solution can ensure the same session management node such as SMF is selected and then the same policy control node such as PCF is selected for multiple sessions (such as PDU sessions) of the UE towards the same data network identified by a data network identification such as DNN and S-NSSAI. The proposed solution can facilitate the usage monitoring for a data network identified by a data network identification such as DNN and S-NSSAI for a UE and ensure that the UE does not consume more quota than allowed in its policy subscription.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to another embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

DETAILED DESCRIPTION

Figure 1:
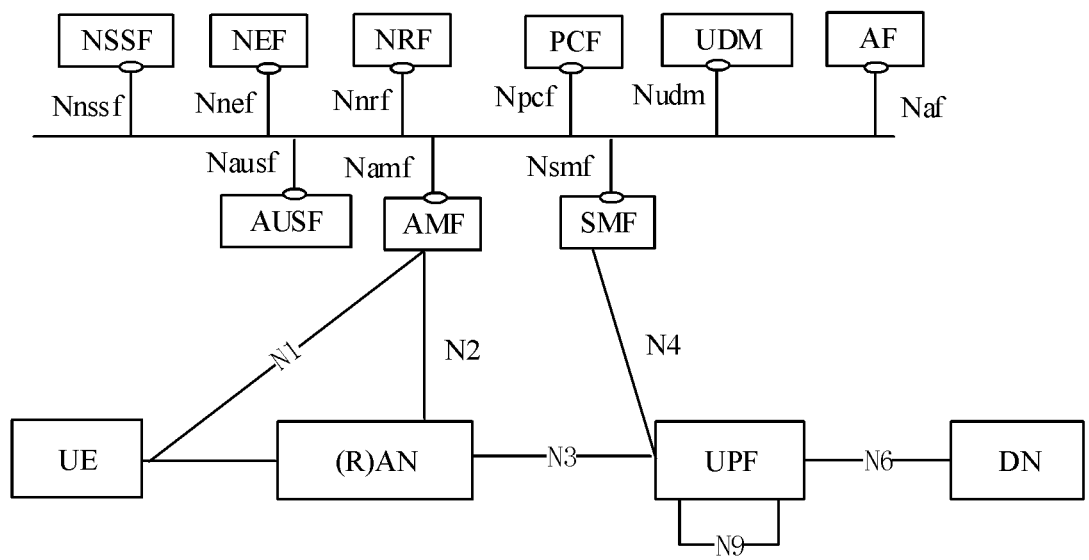
FIG. 1 is a diagram illustrating an exemplary 5G system architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR) or next generation communication standard. In the following description, the terms "network" and "system" can be used interchangeably. Furthermore, the communications between two devices in the network may be performed according to any suitable communication protocols, including, but not limited to, the communication protocols as defined by some of standards organizations such as 3GPP, the International Telecommunication Union (ITU), the Institute of Electrical and Electronics Engineers (IEEE), and the Internet Engineering Task Force (IETF), etc. For example, the communication protocols as defined by 3GPP may comprise 5G communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless/wired communication network. For example, in 5G network, the network function may comprise AUSF, AMF, DN, NEF, NRF, NSSF, PCF, SMF, UDM, UPF, AF, UE, (R)AN, 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the phrase "at least one of A and B" should be understood to mean "only A, only B, or both A and B." The phrase "A and/or B" should be understood to mean "only A, only B, or both A and B."

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture illustrated in FIG. 1. The diagram in FIG. 1 may represent a high level architecture in the next generation network such as 5G. For simplicity, the system architecture of FIG. 1 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. The AUSF, AMF, DN, NEF, NRF, NSSF, PCF, SMF, UDM, UPF, AF, UE, (R)AN may include the functionality for example as defined in 3GPP TS 23.501 V16.0.2.

As used herein the term "access and mobility management node" may implement access and mobility function and other suitable function. The term "session management node" may implement session management function and other suitable function. The term "policy control node" may implement policy function and other suitable function. Please note that the terms "access and mobility management node", "session management node", and "policy control node" etc. as used in this document are used only for ease of description and differentiation among nodes, devices or networks etc. With the development of the technology, other terms with the similar/same meanings may also be used.

Figure 2:
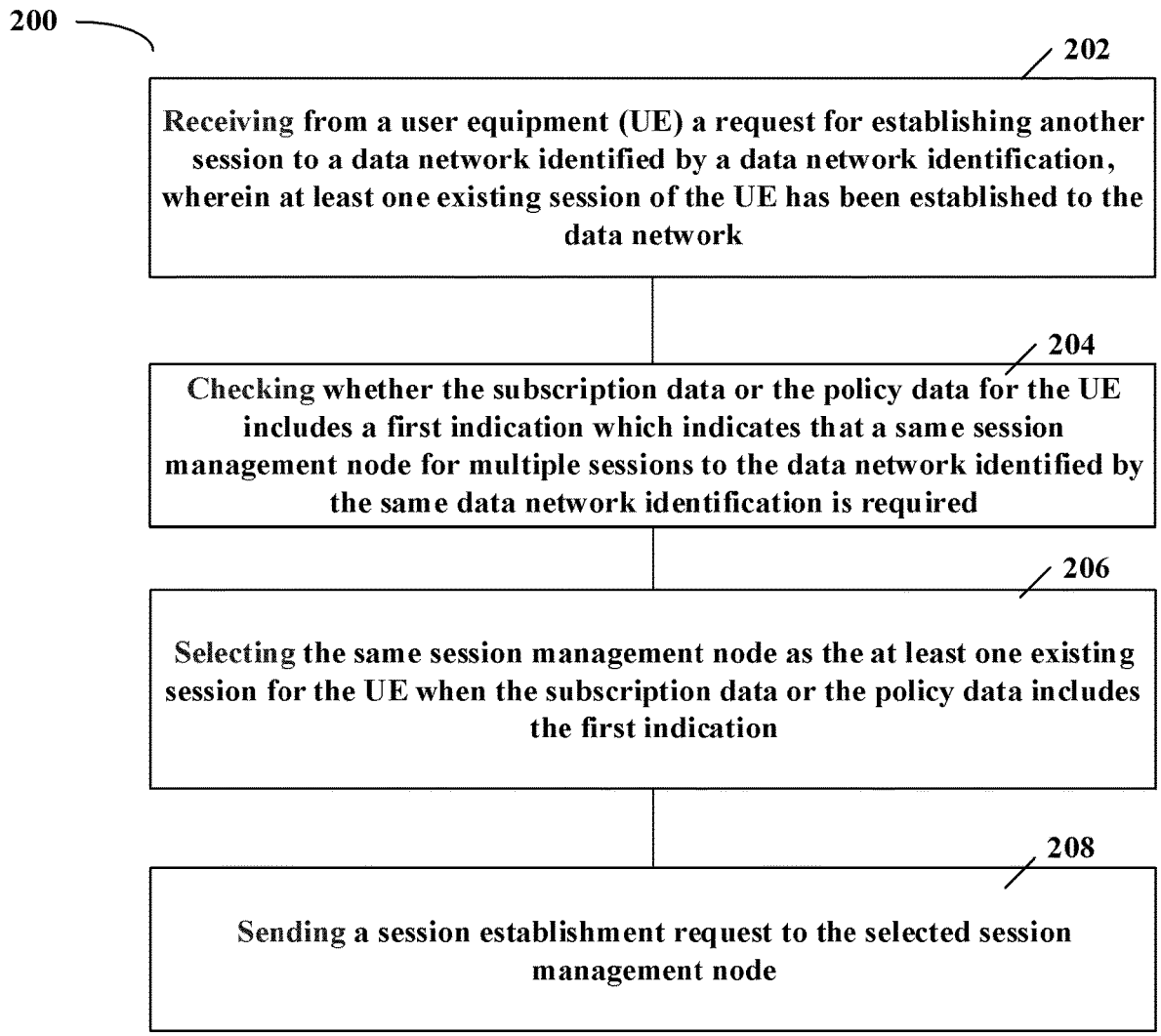
FIG. 2 shows a flowchart of a method according to an embodiment of the present disclosure.

FIG. 2 shows a flowchart of a method 200 according to an embodiment of the present disclosure, which may be performed by an apparatus implemented in or at an access and mobility management node such as the AMF as shown in FIG. 1 or communicatively coupled to the access and mobility management node. As such, the access and mobility management node may provide means for accomplishing various parts of the method 200 as well as means for accomplishing other processes in conjunction with other components.

At block 202, the access and mobility management node receives from a UE a request for establishing another session to a data network identified by a data network identification. At least one existing session of the UE has been established to the data network. The data network identification may be identified by any suitable ways for example depending on a specified network. For example, in the fifth generation system (5GS), the data network identification may be identified by a data network name (DNN) and single network slice selection assistance information (S-NSSAI). The DNN and S-NSSAI may have similar meaning as described in 3GPP TS 23.501 V16.0.2. The session of the UE to the data network may be any suitable session for example depending on a specified network. For example, in 5GS, the session may be a PDU session. In other communication network, the session may have a similar or different name. In addition, the session may be associated with a specified access technology such as 3GPP access or non-3GPP access. In general, the establishment of the UE's first session to the data network may be similar as the existing session establishment for example as described in clause 4.3.2 of 3GPP TS 23.502 V16.0.2, the disclosure of which is incorporated by reference herein in its entirety, and the establishment of the UE's second, third, etc. sessions to the data network may use the method according to the embodiments of the disclosure.

At block 204, the access and mobility management node checks whether the subscription data or the policy data associated with the data network identification for the UE includes a first indication that a same session management node and a same policy control node for multiple sessions to the data network are required. The policy data may include policy information associated with the UE. The subscription data may include subscription information associated with the UE. The subscription data or the policy data associated with the data network identification for the UE may be obtained by the access and mobility management node in various ways. For example, the access and mobility management node such as AMF may obtain the subscription data from a data management node such as UDM during the UE's registration procedure or when the data management node such as UDM updates the subscription data. The access and mobility management node such as AMF may obtain the policy data from the policy control node during the UE's registration procedure or when the policy control node updates the policy data. The first indication may take any suitable form such as a bit. For example, bit "1" may indicate that the same session management node and the same policy control node for multiple sessions to the data network are required and bit "0" may indicate that the same session management node and the same policy control node for multiple sessions to the data network are not required. In general, when the subscription data or the policy data is created or updated, the first indication may be created or updated correspondingly. In general, during the establishment of the UE's first session to the data network, the access and mobility management node may obtain the subscription data or the policy data.

In an embodiment, at block 204, the access and mobility management node may check whether the subscription data or the policy data for the UE includes a first indication which indicates that a same session management node for multiple sessions to the data network identified by the same data network identification is required.

In an embodiment, the first indication further indicates that a same policy control node for the multiple sessions of the UE to the data network identified by the data network identification is required.

At block 206, the access and mobility management node selects the same session management node as the at least one existing session for the UE when the subscription data or the policy data includes the first indication. For example when the at least one existing session is managed by the session management node "A", then the access and mobility management node selects the same session management node "A" to serve the another session to the data network of the UE.

At block 208, the access and mobility management node sends a session establishment request including a second indication selecting the same policy control node as the at least one existing session to the same session management node as the at least one existing session. The session establishment request may be any suitable session establishment request for example depending on the specified network. In 5GS, the session establishment request may be a PDU session establishment request including the second indication. The PDU session establishment request may be similar to the PDU Session Establishment request as described in clause 4.3.2 of 3GPP TS 23.502 V16.0.2 except that it may further include the second indication. The second indication may take any suitable form such as a bit. For example, bit "1" may indicate selecting the same policy control node as the at least one existing session to the same session management node as the at least one existing session is required and bit "0" may indicate that selecting the same policy control node as the at least one existing session to the same session management node as the at least one existing session is not required.

In an embodiment, at block 208, the access and mobility management node sends a session establishment request to the selected session management node.

In an embodiment, the session establishment request includes a second indication selecting the same policy control node as the at least one existing session.

FIG. 3 shows a flowchart of a method 300 according to another embodiment of the present disclosure, which may be performed by an apparatus implemented in or at an access and mobility management node such as the AMF as shown in FIG. 1 or communicatively coupled to the access and mobility management node. As such, the access and mobility management node may provide means for accomplishing various parts of the method 300 as well as means for accomplishing other processes in conjunction with other components. For some parts which have been described in the above embodiments, detailed description thereof is omitted here for brevity.

At block 302, the access and mobility management node obtains the subscription data from a data management node during the UE's registration procedure or when the data management node updates the subscription data. The data management node may be any suitable data management node which can store or access the subscription data. For example, in 5GS, the data management node may be a unified data management (UDM) node. In an embodiment, the subscription data may be obtained by the access and mobility management node such as AMF from an Nudm_SDM_Get service operation or from Nudm_SDM_Notification service operation. The Nudm_SDM_Get service operation may be similar to the corresponding service operation as described in clause 5.2.3.3.2 of 3GPP TS 23.502 V16.0.2. The Nudm_SDM_Notification service operation may be similar to the corresponding service operation as described in clause 5.2.3.3.3 of 3GPP TS 23.502 V16.0.2. In this embodiment, the subscription data may include a first indication that a same session management node and a same policy control node for multiple sessions of a UE to the data network are required.

At block 304, the access and mobility management node receives a request for establishing another session to a data network identified by a data network identification from a UE, wherein at least one existing session of the UE has been established to the data network. Block 304 is similar to block 202.

At block 306, the access and mobility management node checks whether the subscription data associated with the data network identification for the UE include the first indication that a same session management node and a same policy control node for multiple sessions to the data network are required. Block 306 is similar to block 204.

At block 308, the access and mobility management node selects the same session management node as the at least one existing session when the subscription data includes the first indication. Block 308 is similar to block 206.

At block 310, the access and mobility management node sends a session establishment request including a second indication selecting the same policy control node as the at least one existing session to the same session management node as the at least one existing session. Block 310 is similar to block 208.

FIG. 4 shows a flowchart of a method 400 according to another embodiment of the present disclosure, which may be performed by an apparatus implemented in or at an access and mobility management node such as the AMF as shown in FIG. 1 or communicatively coupled to the access and mobility management node. As such, the access and mobility management node may provide means for accomplishing various parts of the method 400 as well as means for accomplishing other processes in conjunction with other components. For some parts which have been described in the above embodiments, detailed description thereof is omitted here for brevity.

At block 402, the access and mobility management node obtains the policy data from the policy control node during the UE's registration procedure or when the policy control node updates the policy data. The policy control node may be any suitable policy control node which can store or access the policy data. For example, in 5GS, the policy control node may be PCF node. In an embodiment, the policy data may be obtained by the access and mobility management node such as AMF from an Npcf_AMPolicyControl_Create service operation and/or Npcf_AMPolicyControl_Update service operation. The Npcf_AMPolicyControl_Create service operation may be similar to the corresponding service operation as described in clause 4.16.1.2 of 3GPP TS 23.502 V16.0.2. The Npcf_AMPolicyControl_Update service operation may be similar to the corresponding service operation as described in clause 4.16.2 of 3GPP TS 23.502 V16.0.2. In this embodiment, the policy data may include a first indication that a same session management node and a same policy control node for multiple sessions to the data network are required.

At block 404, the access and mobility management node receives a request for establishing another session to a data network identified by a data network identification from a UE, wherein at least one existing session of the UE has been established to the data network. Block 404 is similar to block 202.

At block 406, the access and mobility management node checks whether the policy data associated with the data network identification for the UE include the first indication that a same session management node and a same policy control node for multiple sessions to the data network are required. Block 406 is similar to block 204.

At block 408, the access and mobility management node selects the same session management node as the at least one existing session when the policy data includes the first indication. Block 408 is similar to block 206.

At block 410, the access and mobility management node sends a session establishment request including a second indication selecting the same policy control node as the at least one existing session to the same session management node as the at least one existing session. Block 410 is similar to block 208.

In various embodiments, the access and mobility management node may obtain both the subscription data and the policy data. Only if one of the subscription data or the policy data associated with the data network identification for the UE includes the first indication, then the access and mobility management node may select the same session management node as the at least one existing session.

FIG. 5 shows a flowchart of a method 500 according to another embodiment of the present disclosure, which may be performed by an apparatus implemented in or at a session management node such as the SMF as shown in FIG. 1 or communicatively coupled to the session management node. As such, the session management node may provide means for accomplishing various parts of the method 500 as well as means for accomplishing other processes in conjunction with other components. For some parts which have been described in the above embodiments, detailed description thereof is omitted here for brevity.

At block 502, the session management node receives a session establishment request including a second indication selecting a same policy control node as at least one existing session of a user equipment (UE). The session establishment request may be used for establishing another session of the UE to a data network identified by a data network identification and the least one existing session of the UE has been established to the data network. For example, the access and mobility management node may send the session establishment request including the second indication selecting the same policy control node as the at least one existing session of the UE to the session management node at blocks 208, 310 and 410 of FIGS. 2-4, then the session management node may receive this session establishment request.

At block 504, the session management node selects the same policy control node as at least one existing session of the UE.

FIG. 6 shows a flowchart of a method 600 according to another embodiment of the present disclosure, which may be performed by an apparatus implemented in or at a policy control node such as the PCF as shown in FIG. 1 or communicatively coupled to the policy control node. As such, the policy control node may provide means for accomplishing various parts of the method 600 as well as means for accomplishing other processes in conjunction with other components. For some parts which have been described in the above embodiments, detailed description thereof is omitted here for brevity.

At block 602, the policy control node obtains policy data of a UE including a first indication that a same session management node and a same policy control node for multiple sessions of the UE to a data network identified by a data network identification are required. The policy control node may obtain the policy data of the UE in various ways. For example the policy data of the UE may be input or updated into the policy control node. The policy control node may obtain the policy data of the UE from another network device such as UDR for example by retrieving the policy data of the UE from another network device or receiving a notification from another network device for example when the policy data of the UE has been changed.

In an embodiment, at block 602, the policy control node obtains policy data of a user equipment (UE) including a first indication indicating that a same session management node for multiple sessions of the UE to a data network identified by a data network identification is required.

In an embodiment, the first indication further indicates that a same policy control node for the multiple sessions of the UE to the data network identified by the data network identification is required.

At block 604, the policy control node stores the policy data for example in its local storage.

Figure 7:
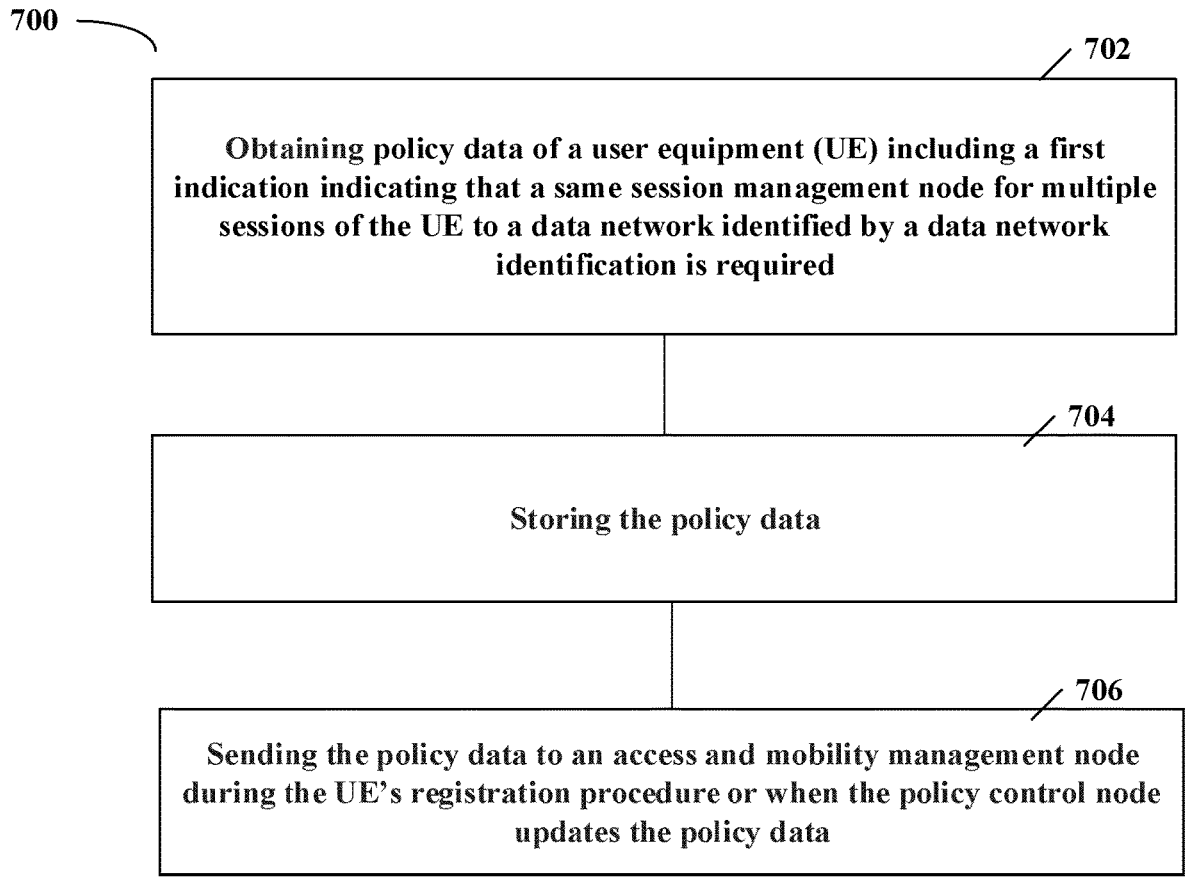
FIG. 7 shows a flowchart of a method according to another embodiment of the present disclosure.

FIG. 7 shows a flowchart of a method 700 according to another embodiment of the present disclosure, which may be performed by an apparatus implemented in or at a policy control node such as the PCF as shown in FIG. 1 or communicatively coupled to the policy control node. As such, the policy control node may provide means for accomplishing various parts of the method 700 as well as means for accomplishing other processes in conjunction with other components. For some parts which have been described in the above embodiments, detailed description thereof is omitted here for brevity. Blocks 702 and 704 are similar to blocks 602 and 604 of FIG. 6.

At block 706, the policy control node sends the policy data to an access and mobility management node such as AMF during the UE's registration procedure or when the policy control node updates the policy data. The policy data may be sent in any suitable message such as an existing message or a new message. For example, in 5GS, the policy data may be sent in an Npcf_AMPolicyControl_Create service operation and/or Npcf_AMPolicyControl_Update service operation.

Figure 8:
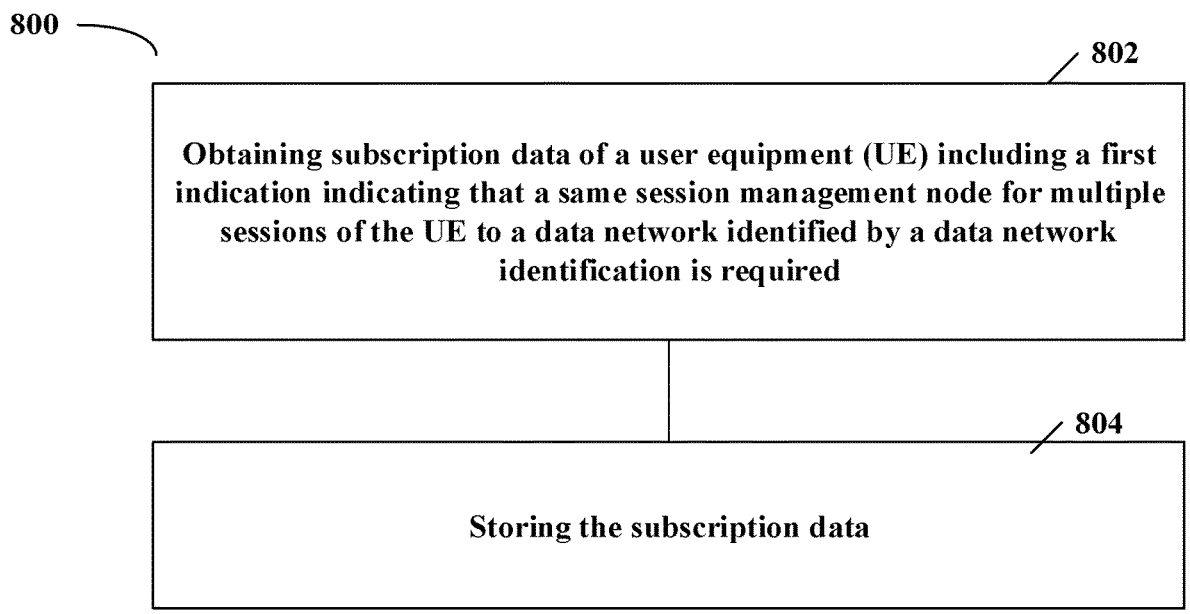
FIG. 8 shows a flowchart of a method according to another embodiment of the present disclosure.

FIG. 8 shows a flowchart of a method 800 according to another embodiment of the present disclosure, which may be performed by an apparatus implemented in or at a data management node such as the UDM as shown in FIG. 1 or communicatively coupled to the data management node. As such, the data management node may provide means for accomplishing various parts of the method 800 as well as means for accomplishing other processes in conjunction with other components. For some parts which have been described in the above embodiments, detailed description thereof is omitted here for brevity.

At block 802, the data management node obtains subscription data of a UE including a first indication that a same session management node and a same policy control node for multiple sessions of the UE to a data network identified by a data network identification are required. The data management node may obtain the subscription data of the UE in various ways. For example the subscription data of the UE may be input or updated into the data management node. The data management node may obtain the subscription data of the UE from another network device such as UDR for example by retrieving the subscription data of the UE from another network device or receiving a notification from another network device for example when the subscription data of the UE has been changed.

In an embodiment, at block 802, the data management node obtains subscription data of a user equipment (UE) including a first indication indicating that a same session management node for multiple sessions of the UE to a data network identified by a data network identification is required.

In an embodiment, the first indication further indicates that a same policy control node for the multiple sessions of the UE to the data network identified by the data network identification is required.

At block 804, the data management node stores the subscription data for example in its local storage.

Figure 9:
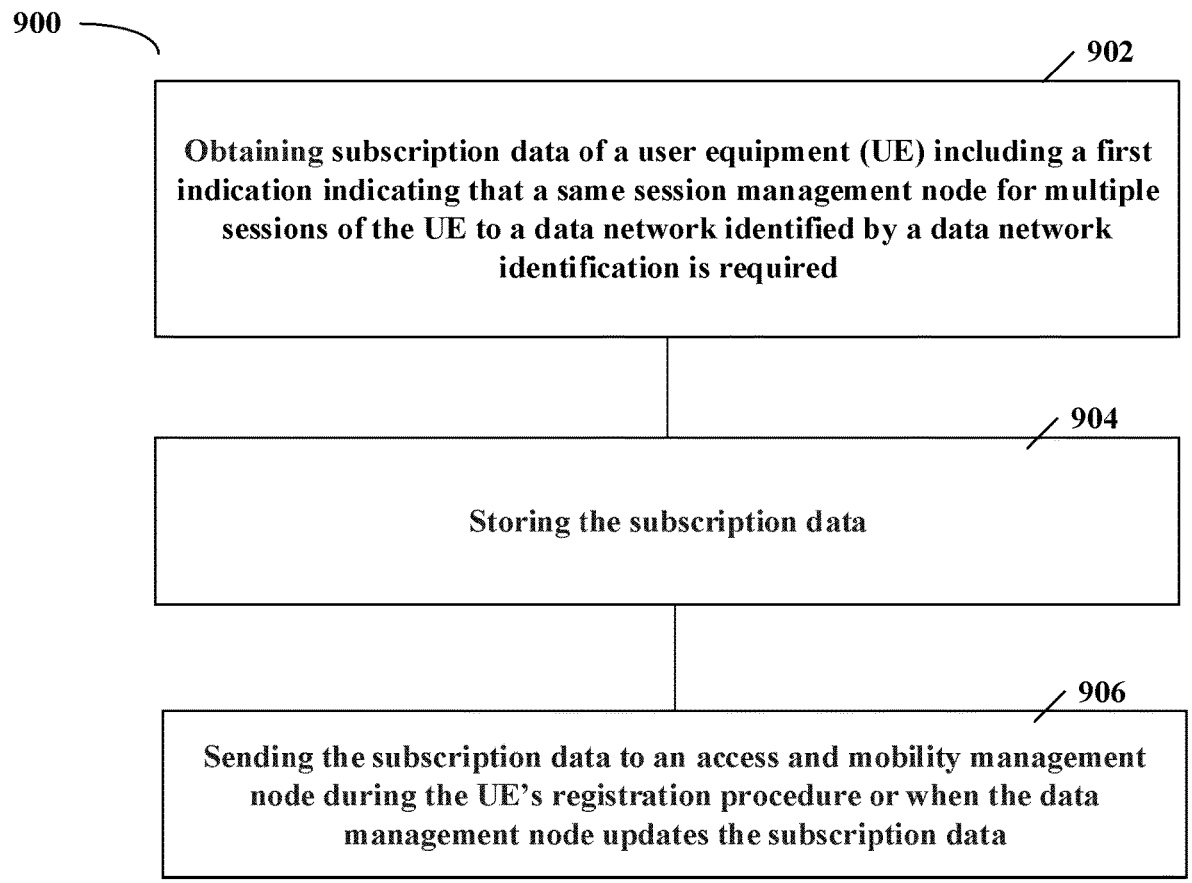
FIG. 9 shows a flowchart of a method according to another embodiment of the present disclosure.

FIG. 9 shows a flowchart of a method 900 according to another embodiment of the present disclosure, which may be performed by an apparatus implemented in or at a data management node such as the UDM as shown in FIG. 1 or communicatively coupled to the data management node. As such, the data management node may provide means for accomplishing various parts of the method 900 as well as means for accomplishing other processes in conjunction with other components. For some parts which have been described in the above embodiments, detailed description thereof is omitted here for brevity. Blocks 902 and 904 are similar to blocks 802 and 804 of FIG. 8.

At block 906, the data management node sends the subscription data to an access and mobility management node during the UE's registration procedure or when the data management node updates the subscription data. The subscription data may be sent in any suitable message such as an existing message or a new message. For example, in 5GS, the subscription data may be sent in an Nudm_SDM_Get service operation and/or from Nudm_SDM_Notification service operation.

In various embodiments, the access and mobility management node may be an AMF node, the session management node may be a SMF node, and the policy control node may be a PCF node.

Figure 10:
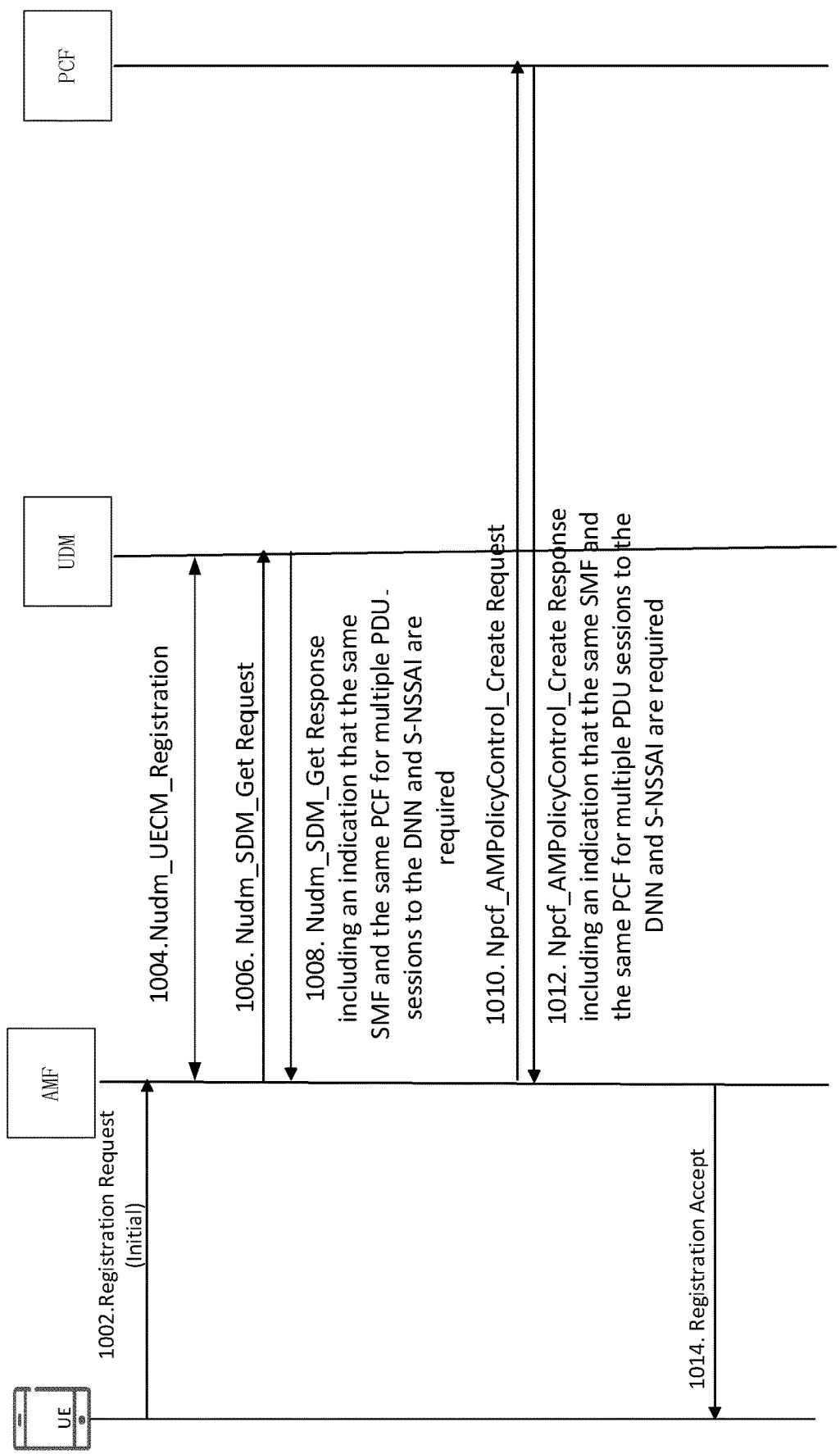
FIG. 10 shows a flowchart of a method according to another embodiment of the present disclosure.

FIG. 10 shows a flowchart of a method according to another embodiment of the present disclosure. In this embodiment, the method may be implemented in 5GS. The messages as shown in FIG. 10 are similar to the corresponding messages as described in clause 4.2.2.2 of 3GPP TS 23.502 V16.0.2, except that the Nudm_SDM_Get Response at step 1008 may include an indication that the same SMF and the same PCF for multiple PDU sessions to the DNN and S-NSSAI are required and the Npcf_AMPolicy Control_Create Response at step 1012 may include an indication that the same SMF and the same PCF for multiple PDU sessions to the DNN and S-NSSAI are required.

Figure 11:
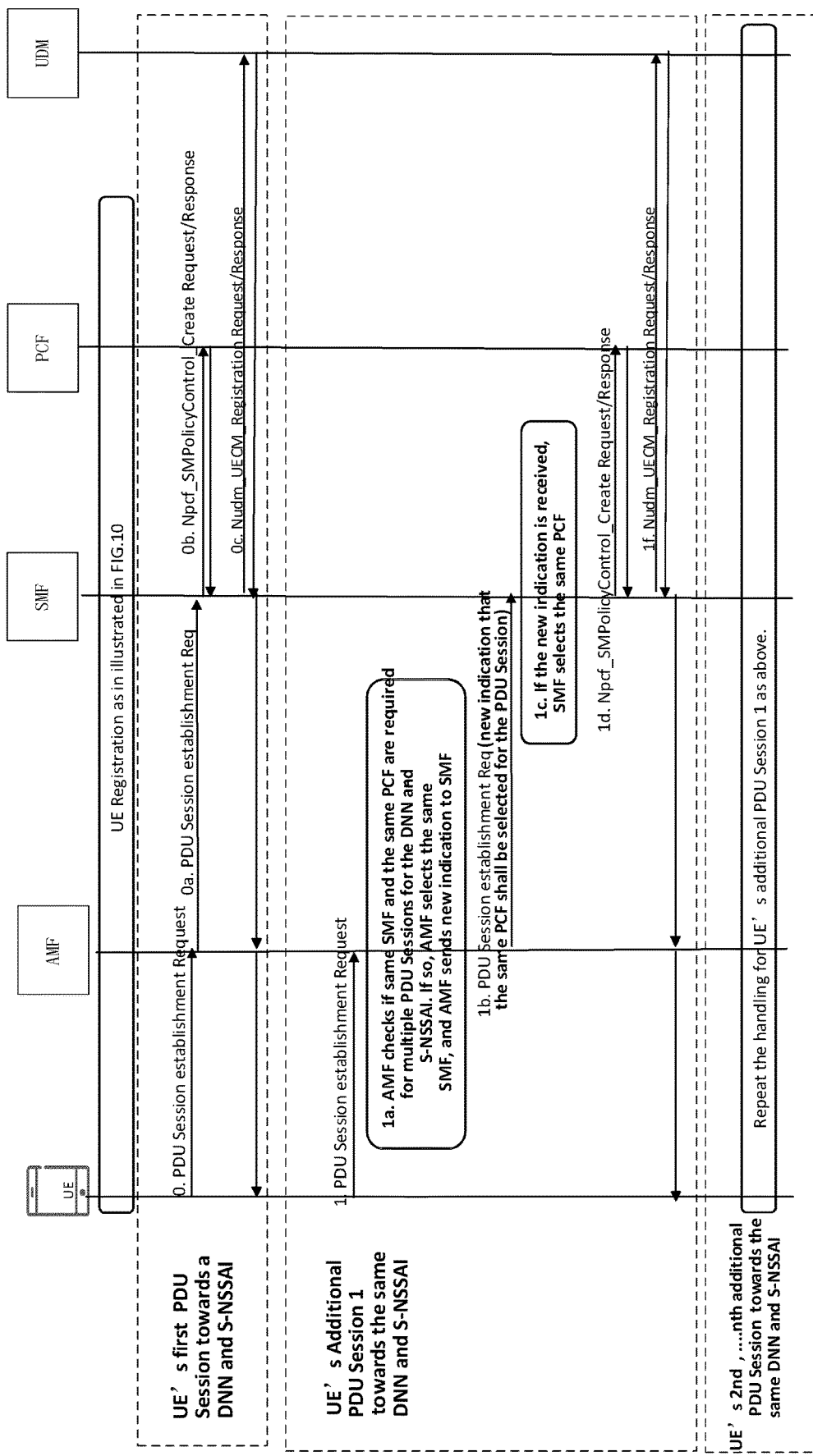
FIG. 11 shows a flowchart of a method according to another embodiment of the present disclosure.

FIG. 11 shows a flowchart of a method according to another embodiment of the present disclosure. In this embodiment, the method may be implemented in 5GS. The messages as shown in FIG. 11 are similar to the corresponding messages as described in clause 4.2.2.2 of 3GPP TS 23.502 V16.0.2, except that at step 1a, AMF checks if same SMF and the same PCF are required for multiple PDU Sessions for the DNN and S-NSSAI). If so, AMF selects the same. If so, AMF selects the same SMF, and AMF sends new indication to SMF; at step 1b, AMF sends PDU Session establishment Request to SMF including new indication that the same PCF shall be selected for the PDU Session; and at step 1c, if the new indication is received, SMF selects the same PCF as the UE's first PDU session towards the DNN and S-NSSAI.

Figure 12A:
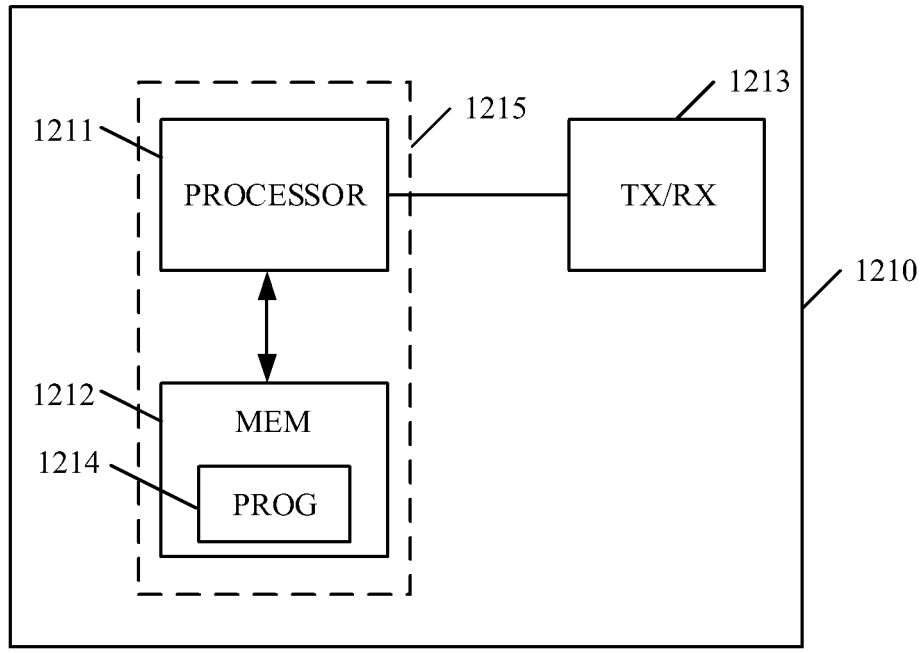
FIGS. 12a-d illustrate simplified block diagrams of apparatus according to embodiments of the present disclosure.
Figure 12B:
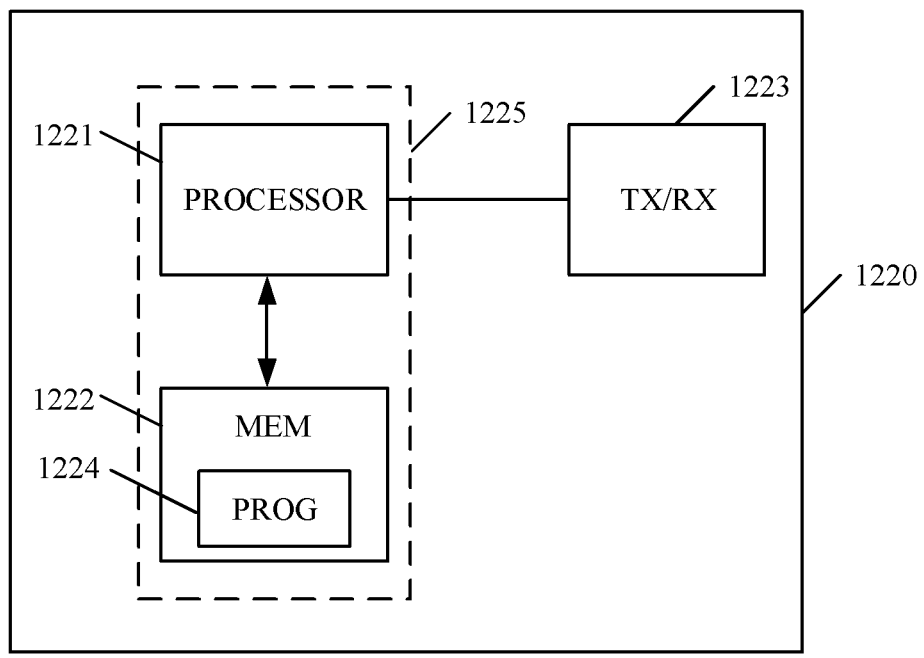
Figure 12C:
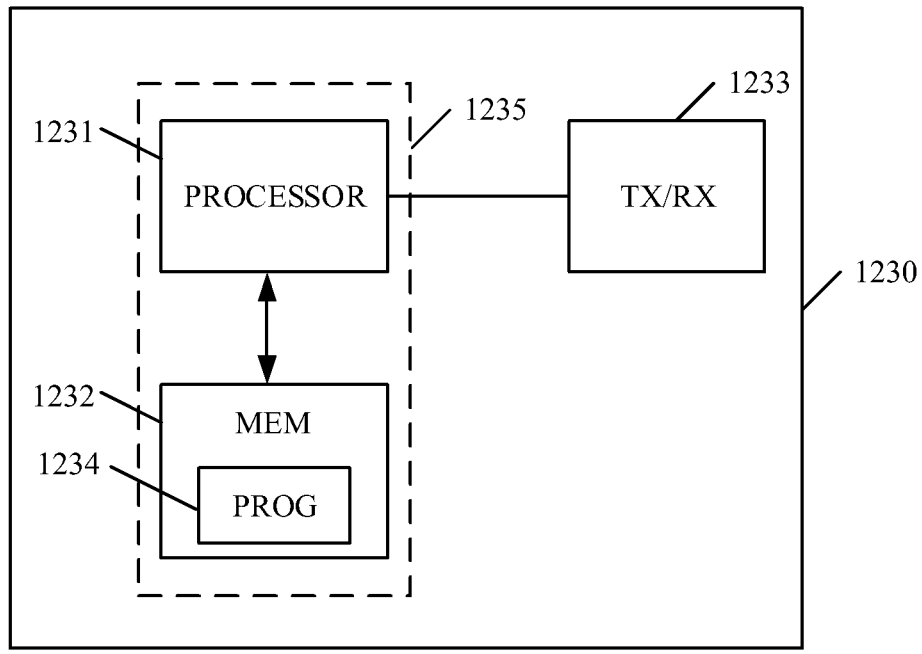
Figure 12D:
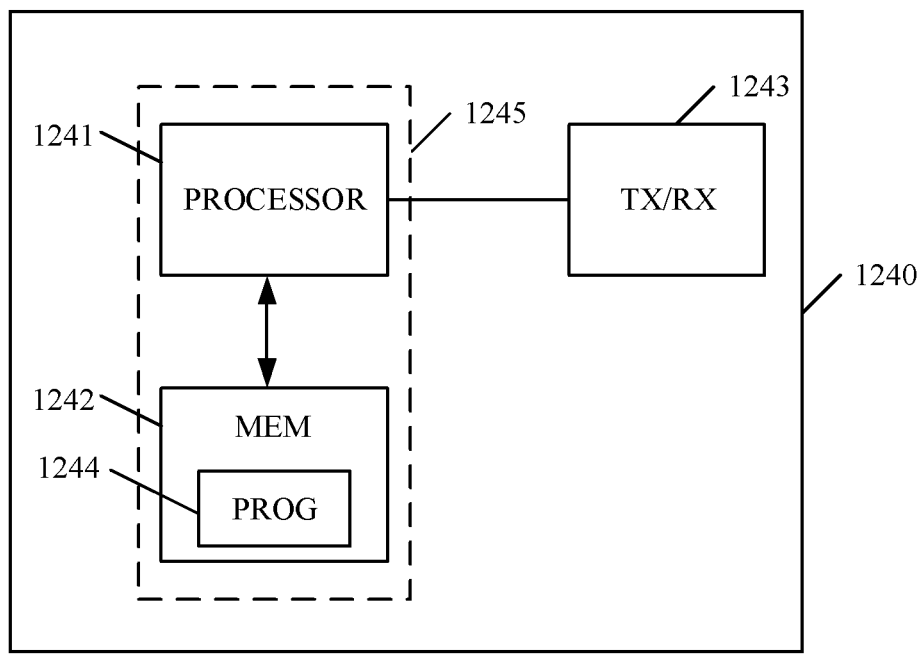

FIG. 12a illustrates a simplified block diagram of an apparatus 1210 that may be embodied in/as an access and mobility management node according to an embodiment of the present disclosure. FIG. 12b illustrates an apparatus 1220 that may be embodied in/as a session management node according to an embodiment of the present disclosure. FIG. 12c illustrates an apparatus 1230 that may be embodied in/as a policy control node according to an embodiment of the present disclosure. FIG. 12d illustrates an apparatus 1240 that may be embodied in/as a data management node according to an embodiment of the present disclosure.

The apparatus 1210 may comprise at least one processor 1211, such as a data processor (DP) and at least one memory (MEM) 1212 coupled to the processor 1211. The apparatus 1210 may further comprise a transmitter TX and receiver RX 1213 coupled to the processor 1211. The MEM 1212 stores a program (PROG) 1214. The PROG 1214 may include instructions that, when executed on the associated processor 1211, enable the apparatus 1210 to operate in accordance with the embodiments of the present disclosure, for example to perform any of the methods related to the access and mobility management node as described above. A combination of the at least one processor 1211 and the at least one MEM 1212 may form processing means 1215 adapted to implement various embodiments of the present disclosure.

The apparatus 1220 comprises at least one processor 1221, such as a DP, and at least one MEM 1222 coupled to the processor 1221. The apparatus 1220 may further comprise a transmitter TX and receiver RX 1223 coupled to the processor 1221. The MEM 1222 stores a PROG 1224. The PROG 1224 may include instructions that, when executed on the associated processor 1221, enable the apparatus 1220 to operate in accordance with the embodiments of the present disclosure, for example to perform any of the methods related to the session management node as described above. A combination of the at least one processor 1221 and the at least one MEM 1222 may form processing means 1225 adapted to implement various embodiments of the present disclosure.

The apparatus 1230 may comprise at least one processor 1231, such as a data processor (DP) and at least one memory (MEM) 1232 coupled to the processor 1231. The apparatus 1230 may further comprise a transmitter TX and receiver RX 1233 coupled to the processor 1231. The MEM 1232 stores a program (PROG) 1234. The PROG 1234 may include instructions that, when executed on the associated processor 1231, enable the apparatus 1230 to operate in accordance with the embodiments of the present disclosure, for example to perform any of the methods related to the policy control node as described above. A combination of the at least one processor 1231 and the at least one MEM 1232 may form processing means 1235 adapted to implement various embodiments of the present disclosure.

The apparatus 1240 may comprise at least one processor 1241, such as a data processor (DP) and at least one memory (MEM) 1242 coupled to the processor 1241. The apparatus 1240 may further comprise a transmitter TX and receiver RX 1243 coupled to the processor 1241. The MEM 1242 stores a program (PROG) 1244. The PROG 1244 may include instructions that, when executed on the associated processor 1241, enable the apparatus 1240 to operate in accordance with the embodiments of the present disclosure, for example to perform any of the methods related to the data management node as described above. A combination of the at least one processor 1241 and the at least one MEM 1242 may form processing means 1245 adapted to implement various embodiments of the present disclosure.

Various embodiments of the present disclosure may be implemented by computer program executable by one or more of the processors 1211, 1221, 1231 and 1241, software, firmware, hardware or in a combination thereof.

The MEMs 1212, 1222, 1232 and 1242 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 1211, 1221, 1231 and 1241 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the access and mobility management node as described above.

According to an aspect of the disclosure it is provided a computer program product being tangibly stored on a computer readable storage medium and including instructions which, when executed on at least one processor, cause the at least one processor to carry out any of the methods related to the session management node as described above.

According to an aspect of the disclosure it is provided a computer program product being tangibly stored on a computer readable storage medium and including instructions which, when executed on at least one processor, cause the at least one processor to carry out any of the methods related to the policy control node as described above.

According to an aspect of the disclosure it is provided a computer program product being tangibly stored on a computer readable storage medium and including instructions which, when executed on at least one processor, cause the at least one processor to carry out any of the methods related to the data management node as described above.

According to an aspect of the disclosure it is provided a computer-readable storage medium storing instructions which when executed by at least one processor, cause the at least one processor to carry out any of the methods related to the access and mobility management node as described above.

According to an aspect of the disclosure it is provided a computer-readable storage medium storing instructions which when executed by at least one processor, cause the at least one processor to carry out any of the methods related to the session management node as described above.

According to an aspect of the disclosure it is provided a computer-readable storage medium storing instructions which when executed by at least one processor, cause the at least one processor to carry out any of the methods related to the policy control node as described above.

According to an aspect of the disclosure it is provided a computer-readable storage medium storing instructions which when executed by at least one processor, cause the at least one processor to carry out any of the methods related to the data management node as described above.

Many advantages may be achieved by applying the proposed solution according to embodiments of the present disclosure. For example, the proposed solution can ensure the same session management node such as SMF is selected and then the same policy control node such as PCF is selected for multiple sessions (such as PDU sessions) of the UE towards the same data network identified by a data network identification such as DNN and S-NSSAI. The proposed solution can facilitate the usage monitoring for a data network identified by a data network identification such as DNN and S-NSSAI for a UE and ensure that the UE does not consume more quota than allowed in its policy subscription.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of operating an access and mobility management node, the method comprising:
   receiving, from a user equipment (UE), a request for establishing another session to a data network identified by a data network identification, wherein at least one existing session of the UE has been established to the data network;
   checking whether subscription data or policy data for the UE includes a first indication which indicates that a same session management node for multiple sessions to the data network identified by the same data network identification is required;
   selecting, based on the checking, the same session management node as the at least one existing session for the UE when the subscription data or the policy data includes the first indication; and
   sending a session establishment request to the selected session management node.

2. The method of claim 1, wherein the session establishment request includes a second indication selecting a same policy control node as the at least one existing session.

3. The method of claim 2, wherein the session establishment request is a protocol data unit (PDU) session establishment request including the second indication.

4. The method of claim 2, wherein the access and mobility management node is an access and mobility management function (AMF) node, the session management node is a session management function (SMF) node, and the policy control node is a policy control function (PCF) node.

5. The method of claim 1, wherein the data network identification is identified by a data network name (DNN) and single network slice selection assistance information (S-NSSAI).

6. The method of claim 1, further comprising obtaining the subscription data, from a data management node, during the UE's registration procedure or when the data management node updates the subscription data.

7. The method of claim 6, wherein the data management node is a unified data management (UDM) node.

8. The method of claim 7, wherein the subscription data is obtained from an Nudm_SDM_Get service operation or from Nudm_SDM_Notification service operation.

9. The method of claim 1, further comprising obtaining the policy data, from a policy control node, during the UE's registration procedure or when the policy control node updates the policy data.

10. The method of claim 9, wherein the policy data is obtained from an Npcf_AMPolicyControl_Create service operation and/or Npcf_AMPolicyControl_Update service operation.

11. A method of operating a session management node, the method comprising:
receiving a session establishment request, the session establishment request including a second indication selecting a same policy control node as at least one existing session of a user equipment (UE), wherein the session establishment request is used for establishing another session of the UE to a data network identified by a data network identification, and wherein the least one existing session of the UE has been established to the data network; and
selecting the same policy control node as at least one existing session of the UE.

12. The method of claim 11, wherein the data network identification is identified by a data network name (DNN) and single network slice selection assistance information (S-NSSAI).

13. The method of claim 11, wherein the session establishment request is a protocol data unit (PDU) session establishment request including the second indication.

14. The method of claim 11, wherein the session management node is a session management function (SMF) node and the policy control node is a policy control function (PCF) node.

15. An apparatus at an access and mobility management node, the apparatus comprising:
processing circuitry;
memory containing instructions executable by the processing circuitry whereby the apparatus is operative to:
receive, from a user equipment (UE), a request for establishing another session to a data network identified by a data network identification, wherein at least one existing session of the UE has been established to the data network;
check whether subscription data or policy data for the UE includes a first indication which indicates that a same session management node for multiple sessions to the data network identified by the same data network identification is required;
select the same session management node as the at least one existing session for the UE when the subscription data or the policy data includes the first indication; and
send a session establishment request to the selected session management node.

16. An apparatus at a session management node, the apparatus comprising:
processing circuitry;
memory containing instructions executable by the processing circuitry whereby the apparatus is operative to:
receive a session establishment request, the session establishment request including a second indication selecting a same policy control node as at least one existing session of a user equipment (UE), wherein the session establishment request is used for establishing another session of the UE to a data network identified by a data network identification, and wherein the least one existing session of the UE has been established to the data network; and
select the same policy control node as at least one existing session of the UE.

* * * * *

UNITED STATES PATENT AND TRADEMARK OFFICE
CERTIFICATE OF CORRECTION

PATENT NO. : 12,016,068 B2  
APPLICATION NO. : 17/608917  
DATED : June 18, 2024  
INVENTOR(S) : Pancorbo Marcos et al.

Page 1 of 2

It is certified that error appears in the above-identified patent and that said Letters Patent is hereby corrected as shown below:

On the Title Page

Below "Item (65)" insert -- (30) Foreign Application Priority Data May 06, 2019 (WO) ............... PCT/CN2019/085718 --.

In the Drawings

In Fig. 5, Sheet 5 of 11, for Tag "502", in Line 5, delete "the least" and insert -- the at least --, therefor.

In Fig. 11, Sheet 9 of 11, delete "UE' s first" and insert -- UE's first --, therefor.

In Fig. 11, Sheet 9 of 11, delete "UE' s Additional" and insert -- UE's Additional --, therefor.

In Fig. 11, Sheet 9 of 11, delete "UE' s 2nd" and insert -- UE's 2nd --, therefor.

In Fig. 11, Sheet 9 of 11, delete "UE' s additional" and insert -- UE's additional --, therefor.

In the Specification

In Column 1, Lines 33-35, delete "Unified Data Management (UDM), User Plane Function (UPF), Application Function (AF), User Equipment (UE), (Radio) Access Network ((R)AN), etc." and insert the same at Line 32, after "(SMF)," as a continuation paragraph.

In Column 3, Line 24, delete "the least" and insert -- the at least --, therefor.

In Column 4, Line 14, delete "the least" and insert -- the at least --, therefor.

In Column 4, Line 48, delete "eleventh ninth" and insert -- eleventh --, therefor.

In Column 7, Line 36, delete "(IOT)" and insert -- (IoT) --, therefor.

Signed and Sealed this  
Twenty-second Day of April, 2025

Coke Morgan Stewart  
*Acting Director of the United States Patent and Trademark Office*

In Column 9, Line 45, delete "according" and insert -- according to --, therefor.

In Column 12, Line 60, delete "the least" and insert -- the at least --, therefor.

In Column 15, Line 8, delete "S-NSSAI)." and insert -- S-NSSAI. --, therefor.

In Column 17, Line 34, delete "Blue-ray" and insert -- Blu-ray --, therefor.

In the Claims

In Column 19, Line 36, in Claim 11, delete "least" and insert -- at least --, therefor.

In Column 20, Line 40, in Claim 16, delete "least" and insert -- at least --, therefor.